US011667386B2

(12) United States Patent
Godecker et al.

(10) Patent No.: US 11,667,386 B2
(45) Date of Patent: Jun. 6, 2023

(54) INTEGRATED AIRCRAFT GALLEY AND APPLIANCE OPERATING SYSTEM

(71) Applicant: B/E Aerospace, Inc., Winston Salem, NC (US)

(72) Inventors: William J. Godecker, Irvine, CA (US); Nicolaas Van Zwieten, Ravenswaaij (NL); Michael Kemery, Seattle, WA (US); Eid-Beng Goh, Seattle, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 908 days.

(21) Appl. No.: 16/520,980

(22) Filed: Jul. 24, 2019

(65) Prior Publication Data

US 2019/0382118 A1 Dec. 19, 2019

Related U.S. Application Data

(63) Continuation of application No. 15/977,941, filed on May 11, 2018, now Pat. No. 10,370,105, which is a
(Continued)

(51) Int. Cl.
*B64D 11/00* (2006.01)
*B64D 11/04* (2006.01)
(Continued)

(52) U.S. Cl.
CPC .... *B64D 11/00155* (2014.12); *B64D 11/0015* (2013.01); *B64D 11/00153* (2014.12);
(Continued)

(58) Field of Classification Search
CPC .......... B64D 11/00155; B64D 11/0015; B64D 11/00153; B64D 11/04; B64D 2045/0085;
(Continued)

(56) References Cited

U.S. PATENT DOCUMENTS 5,159,994 A 11/1992 Luria
5,936,318 A 8/1999 Weiler et al.
(Continued)

FOREIGN PATENT DOCUMENTS

EP 2338792 A2 6/2011

OTHER PUBLICATIONS

International Search Report and Written Opinion dated Sep. 18, 2013 for PCT/US2013/033497.
(Continued)

*Primary Examiner* — Valentina Xavier
(74) *Attorney, Agent, or Firm* — Suiter Swantz pc llo

(57) ABSTRACT

A system for communicating between passenger seats and an aircraft galley. The system may include a control unit including a display area for interfacing with a crew member. The system may include a plurality of devices, each positioned at a respective passenger seat. The control unit may be adapted to display on the display area data related to a particular order, including a location of an associated passenger seat. The control unit may be further adapted to transmit to a particular device associated with the order notifications concerning a status of the particular order.

19 Claims, 7 Drawing Sheets

Related U.S. Application Data continuation of application No. 15/397,633, filed on Jan. 3, 2017, now Pat. No. 9,994,319, which is a continuation of application No. 15/219,241, filed on Jul. 25, 2016, now abandoned, which is a continuation of application No. 13/848,210, filed on Mar. 21, 2013, now Pat. No. 9,415,872.

(60) Provisional application No. 61/614,730, filed on Mar. 23, 2012.

(51) Int. Cl.
*G06F 3/14* (2006.01)
*B64D 45/00* (2006.01)
*G06F 3/04817* (2022.01)
*G06F 3/0488* (2022.01)

(52) U.S. Cl.
CPC ............ *B64D 11/04* (2013.01); *G06F 3/1431* (2013.01); *B64D 2045/0085* (2013.01); *G06F 3/0488* (2013.01); *G06F 3/04817* (2013.01); *Y02T 50/40* (2013.01)

(58) Field of Classification Search
CPC .. G06F 3/1431; G06F 3/04817; G06F 3/0488; Y02T 50/40
See application file for complete search history.

(56) References Cited

U.S. PATENT DOCUMENTS

| | | | |
|---|---|---|---|
| 6,177,887 B1* | 1/2001 | Jerome | H04N 7/18 379/49 |
| 7,098,555 B2 | 8/2006 | Glahn et al. | |
| 7,780,114 B2 | 8/2010 | Doebertin et al. | |
| 8,005,480 B2 | 8/2011 | Ashish et al. | |
| 8,289,670 B2 | 10/2012 | Aronson et al. | |
| 8,543,259 B2 | 9/2013 | Schalla et al. | |
| 8,814,087 B2 | 8/2014 | Koschberg et al. | |
| 9,422,057 B2 | 8/2016 | Koschberg et al. | |
| 2004/0057177 A1* | 3/2004 | Glahn | H02J 3/14 361/62 |
| 2005/0121978 A1* | 6/2005 | McAvoy | H02J 3/14 307/43 |
| 2008/0001031 A1 | 1/2008 | Doebertin et al. | |
| 2008/0141315 A1* | 6/2008 | Ogilvie | H04N 7/15 725/77 |
| 2009/0103221 A1 | 4/2009 | Aronson et al. | |
| 2009/0112377 A1 | 4/2009 | Schalla et al. | |
| 2010/0243800 A1* | 9/2010 | Koschberg | B64D 11/04 244/118.5 |
| 2012/0217343 A1 | 8/2012 | Koschberg et al. | |

OTHER PUBLICATIONS

International Preliminary Report on Patentability dated Sep. 23, 2014 for PCT/US2013/033497.

\* cited by examiner

INTEGRATED AIRCRAFT GALLEY AND APPLIANCE OPERATING SYSTEM

CROSS-REFERENCES TO RELATED APPLICATIONS

This is a continuation application based on U.S. Ser. No. 15/977,941, filed on May 11, 2018, which is a continuation of U.S. Ser. No. 15/397,633, filed on Jan. 3, 2017, which is a continuation of U.S. Ser. No. 15/219,241, filed on Jul. 25, 2016, which is a continuation of U.S. Ser. No. 13/848,210, filed on Mar. 21, 2013, which claims priority from U.S. Provisional Patent Application No. 61/614,730, filed Mar. 23, 2012, which are incorporated herein by reference in their entirety.

BACKGROUND

Commercial aviation tends to be a very competitive industry vying for the consumer's dollar. To compete in the industry, airlines must strive to be efficient in all areas while offering passengers amenities that bring attention to the airlines and induce passengers to fly with a particular airlines. One area of interest to the passengers is the inflight experience, including the food and beverage service. Passengers want a variety of options for food and beverage, which is a challenge to the airlines who want to conserve weight and space. The conflict between passenger experience and airline economics is never more prominent than in in the aircraft's galley. An aircraft galley refers to the area of the vehicle that is used by the flight attendants to service the passengers, particularly the passengers' food and beverage needs. Due to constraints with space and weight, these areas are very ordered and efficient in all aspects of their construction and arrangement. One important consideration in the design of the galley is the power distribution and power consumption of the various equipment, or "inserts." Inserts can be any power consumer such as a coffee brewer, an oven, a trash compactor, an overhead light, or any other electrical appliance that can be found in the galley area. Power on an aircraft is a limited and controlled commodity, and the control of the power is an important consideration in every galley.

The power arrangement of the aircraft galley is traditionally been a series of individual appliances connected to a main power supply, each appliance individually operated by its own controls, power switch, etc. Because power is limited on a flying aircraft, the management of this power is critical to the safe and reliable operation of the aircraft. However, with each individual appliance operating independently of the other appliances, control over the power structure is limited. Also, there is no easy way of discerning an overall health of the power system or run diagnostics of the system. Rather, each applicant must be polled individually to determine its health, operational condition, maintenance, etc. Because of the arrangement of some galleys, this can be labor intensive and expensive to conduct. What the art needs is a galley power system than can interface with all of the various equipment in the galley, run diagnostics and service inquiries, and control the galley through an interface that manages the power according to a hierarchy.

Another aspect of the efficiency of the galley is the communication between galleys, flight attendants, and passengers. The service and satisfaction of the passengers is of great concern to airlines, but there are challenges to attending to so many customers confined in such close quarters. Most communication is either vocal, or in some cases there is limited electronic communication between the passengers and the galley. However, the state of the art aircraft lacks a comprehensive communication system that links the passengers, galley, and flight attendants in an efficient manner.

SUMMARY OF THE INVENTION

The present invention is an integrated galley and appliance operating system for use in an aircraft that consolidates the operation and power distribution of the galley to a single control panel. The integrated galley and appliance operating system provides a single operating interface for electrical appliances such ovens, coffee makers, toasters, refrigerators, lighting, etc., eliminating the need to control each appliance at its individual controls. A total system controller (TSC) is located remote from the individual appliances with sufficient capability to operate each one individual appliance or as combined functions. For example, using the system controller, two or more ovens could be started on similar cooking cycles starting at the same time. The result is that the meals are finished at the same time, reducing work load on the attendants. In addition, the controller monitors all of the appliances and prioritizes the power requirements. The total system controller also preferably monitors appliances for diagnostic purposes, and produces a system "health" status to aircraft maintenance personnel or maintenance communication systems. The integrated control system has the power controls built in and provides power management for optimizing power usage.

The galley control of the present invention includes an integrated communication system that links passengers, flight attendants, and galleys, through voice or electronic messaging. This allows passengers to communicate with the galley, and galleys to communicate with each other, in order to better service the passengers. Moreover, using handheld devices such as smart phones, PDAs, or other communication devices, the galley can also communicate with flight attendants throughout the aircraft. The communication system improves efficiency and allows for more expedient and better service to the passengers.

Other features and advantages of the present invention will become more apparent from the following detailed description of the preferred embodiments in conjunction with the accompanying drawings, which illustrate by way of example the operation of the invention.

DETAILED DESCRIPTION OF THE PREFERRED EMBODIMENTS

Figure 1:
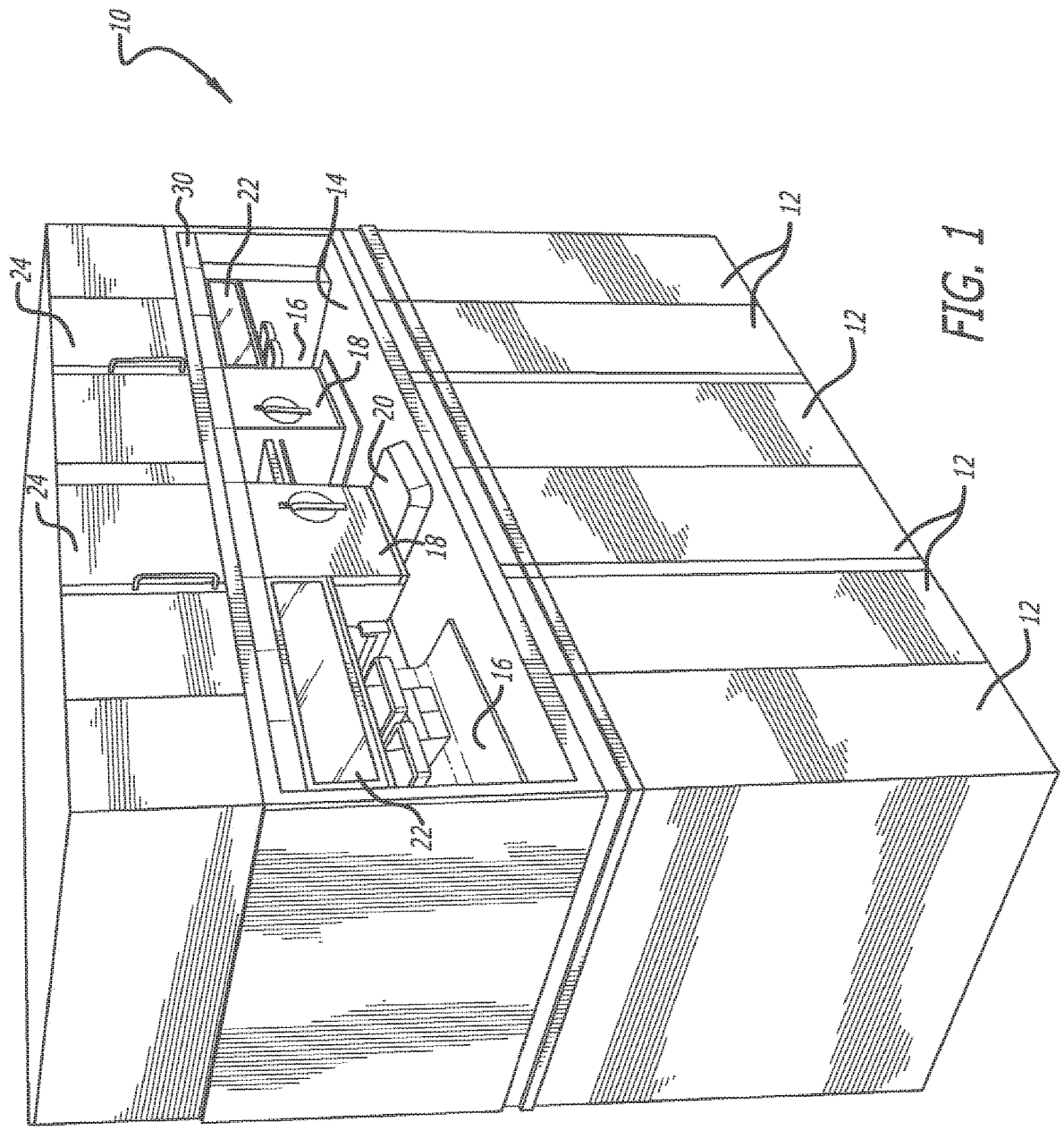
FIG. 1 is an exemplary aircraft galley monument having a power sharing system and operational control system of the present invention.

FIG. 1 illustrates a galley monument 10 that is one half of an aircraft galley that can incorporate the features and benefits of the present invention. Typically another galley monument (not shown) would be opposed to the galley 10 and incorporate other appliances and equipment such as additional ovens, food storage, trash compactors, and the like. It should be understood that the specific features of the galley appliances are not critical to the present invention, and other appliances can be substituted or rearranged without departing from the present invention. In the example galley monument 10 depicted in FIG. 1, a plurality of compartments 12 are provided for housing beverage carts, and there is an ample workspace 14 for preparing food and beverages for the passengers. The workspace 14 may include various GAINs, short for "GAlley INserts," including beverage brewing machines 16, ovens 18, a sink 20, and overhead lighting above the workspace 14. Cabinets 22 are provided to house coffee mugs, serving utensils, and the like, and overhead chillers 24 can store canned beverages, alcoholic beverages, perishables, and the like. In other galleys, the chillers are located in slots where the beverage brewing equipment 16 is located in the galley of FIG. 1. Along the front face of the galley 10 is a universal control panel 30 that is used to control the operations and monitor all of all power-consuming equipment, lights, etc. in the galley 10.

Figure 2:
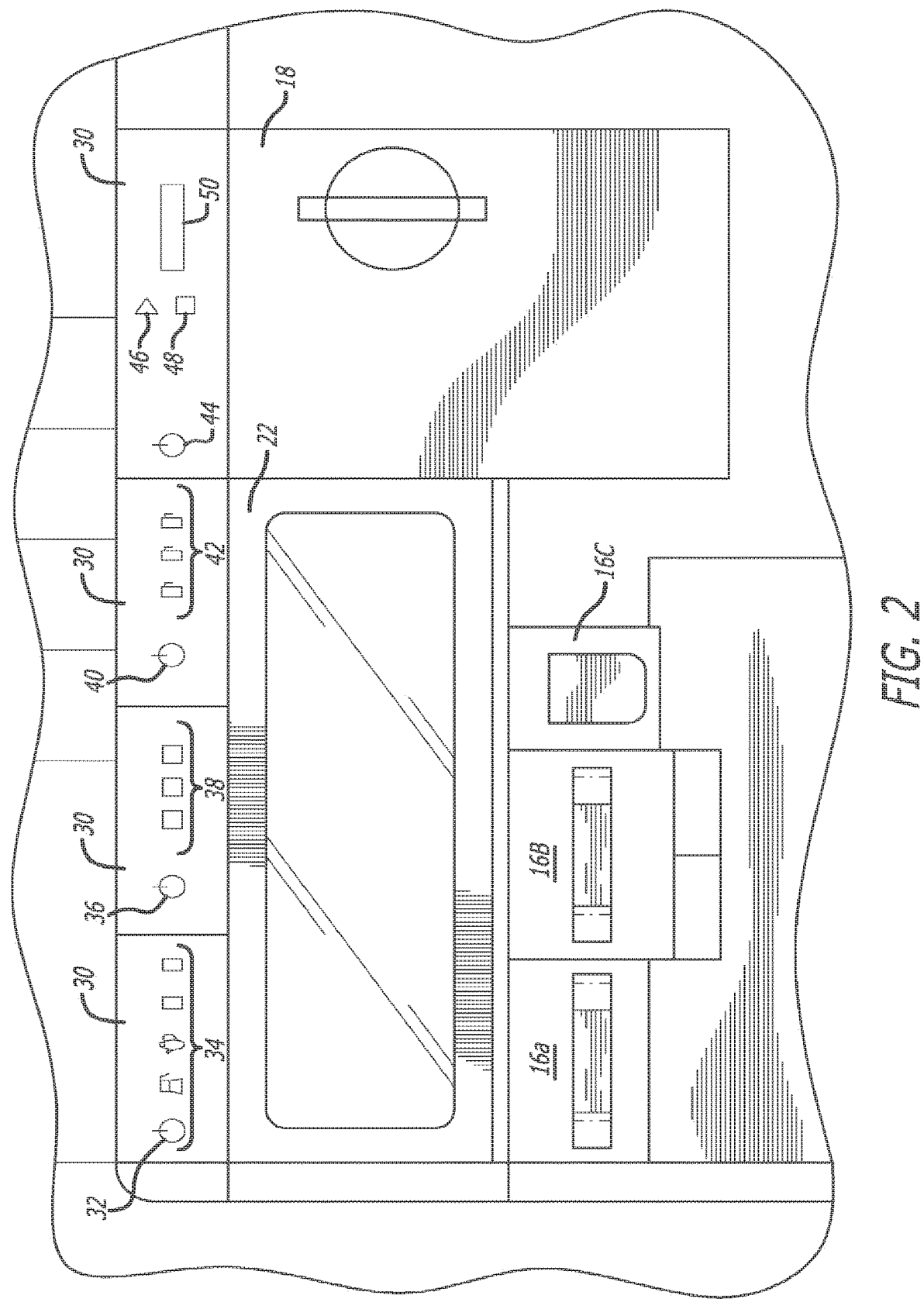
FIG. 2 is an enlarged front view of a power and operation distribution panel for the galley monument of FIG. 1.

FIG. 2 illustrates the control panel 30 that is used to operate the GAINs of the galley 10. The control panel 30 in a preferred embodiment uses touch screen technology to enter commands into the system. For example, beverage maker 16a may represent a coffee maker that can be controlled at the universal galley control panel 30. The control panel 30 includes a power button 32, and various coffee machine control buttons 34 for operating the coffee machine. One button may correspond to a stronger brew versus a weaker brew, or a timer for beginning the brewing operation. Each of these control buttons is linked through the galley operation control unit 40 to the individual power consumers (i.e., the coffee maker, oven, chiller, etc), or GAINs. Similarly, the espresso machine 16b is controlled by touch screen buttons 36 and 38 on the universal control panel 30 to operate the espresso machine 16b in the galley. GAIN 16c is similarly controlled by buttons 40, 42 on the galley control panel 30. The oven 18 is also controlled via touch screen buttons 44, 46, 48 on the universal control panel 30. Button 44 may be a power button to initiate power to the oven 18, and a display window 50 scrolls instructions, temperatures, durations, etc. that is adjusted by the buttons 46, 48. The galley lights, chillers, trash compactors, and other GAINs are similarly controlled using the galley universal control panel 30 as opposed to controls on the individual GAINs themselves.

Figure 3:
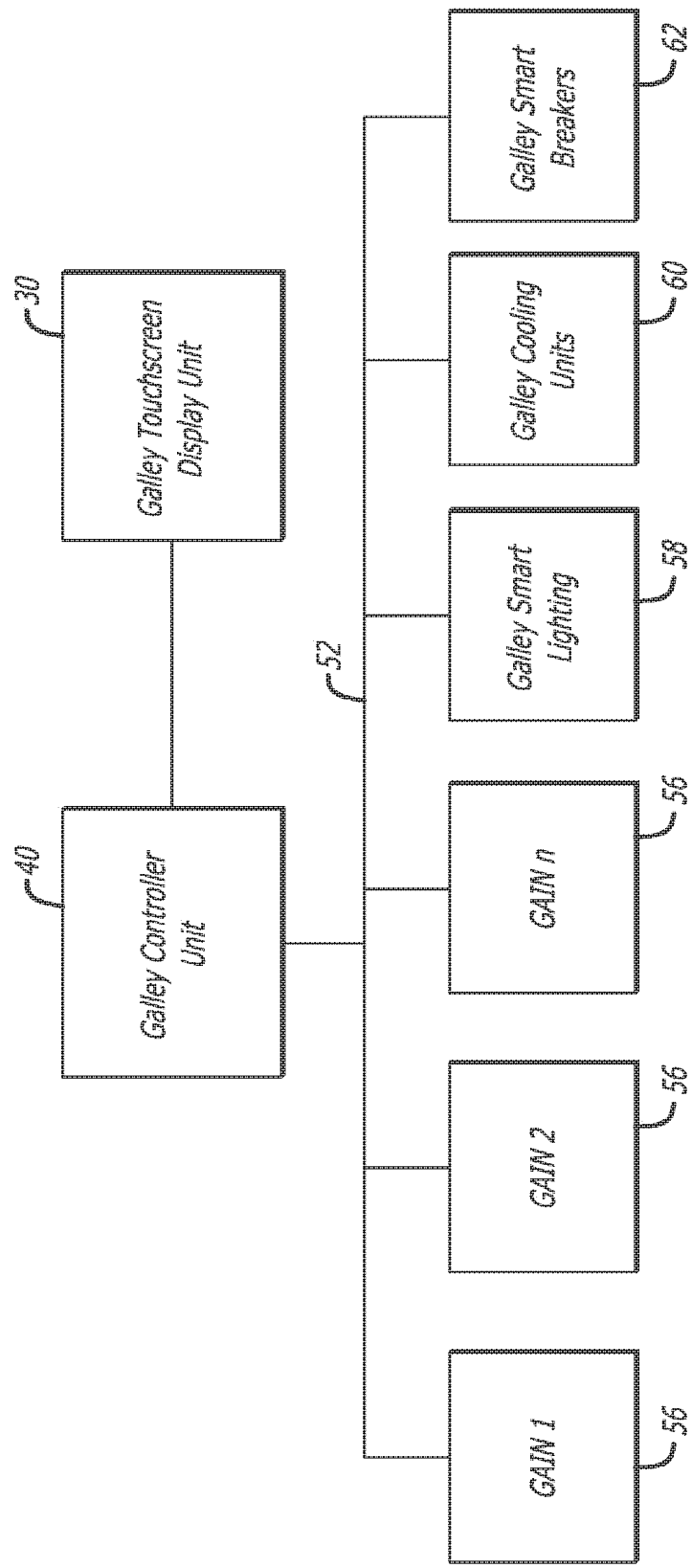
FIG. 3 is a schematic of an operation control system for the galley monument of the present invention.

FIG. 3 illustrates the operation of the GAINs control via the galley universal touch screen unit 30. Commands entered by the operation at the touch screen control unit 30 are communicated to the galley control unit 40, which parses and identifies the commands and their associated appliance. A bus 52 connects each GAIN 56, be it an oven, brewing apparatus, trash compactor, or any other power client of the galley 10 to the galley controller unit 40. Commands are communicated along the bus 52 to the individual GAINs 56, which receive the commands and are executed at the GAINs themselves. The bus 52 also connects the smart galley lighting 58, the galley cooling units 60, and the galley smart circuit breakers 62. In this manner, the touchscreen panel 30 can send commands to all of the power consumers in the galley along a single bus, allowing galley operation at a single location. For example, the touchscreen display could be used to start a pair of ovens or initiate a coffee brewing operation from a single location. The integrated operating system may also contain a display panel (not shown) that reports the status and functionality of each GAINs. The display panel could indicate which GAINs are operational, which ones are currently in use, whether maintenance is due on any of the GAINs, or any error codes or services messages. The fact that the entire galley's status can be checked from a single location is a significant advantage over the existing systems and saves both time and manpower servicing the galley. Alternately, each individual GAIN could include its own display panel, such as that shown in FIG. 2 (see display 50).

Figure 4:
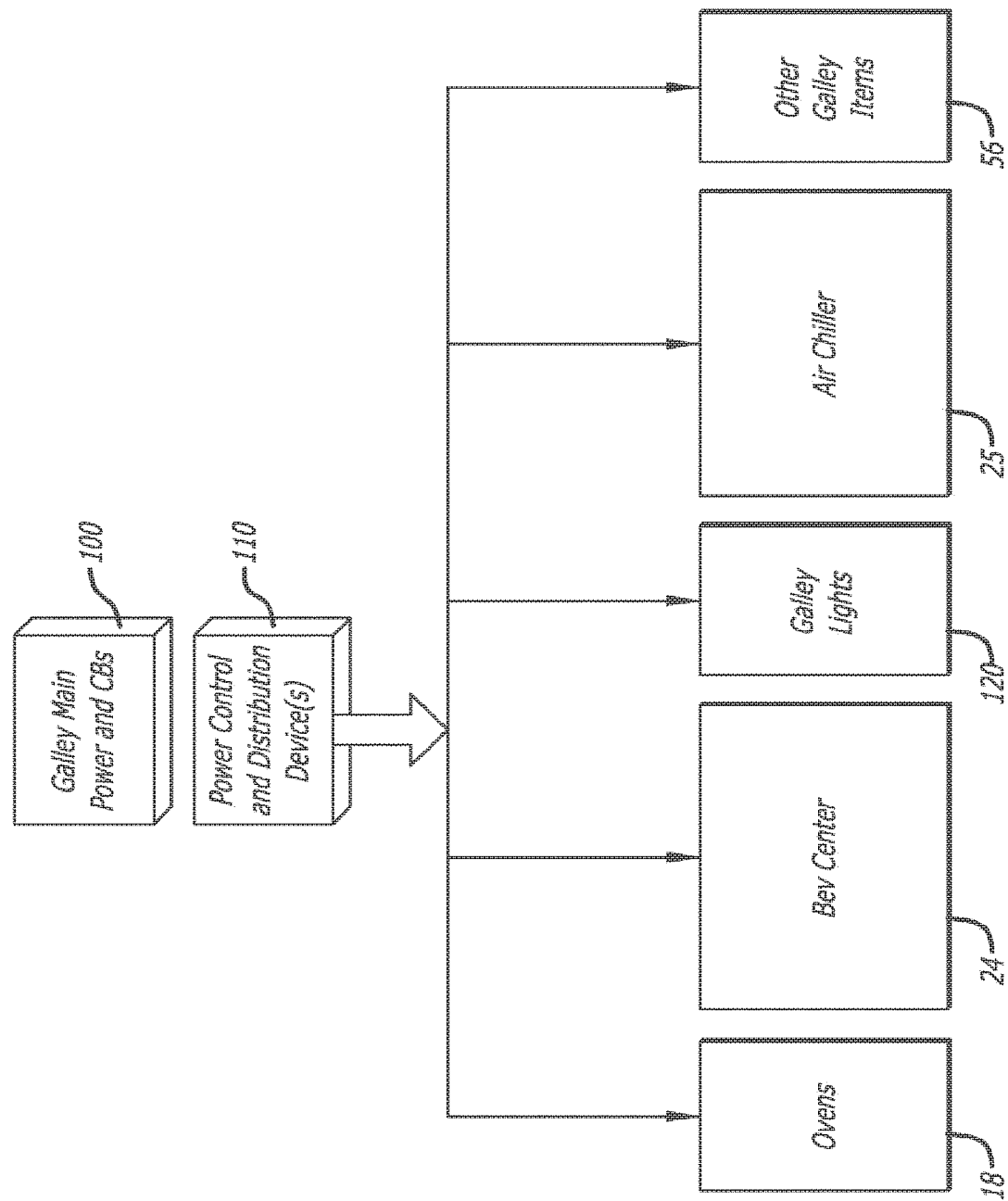
FIG. 4 is a schematic of a power control system for the galley monument of the present invention.

FIG. 4 illustrates a block diagram corresponding to a power sharing and control system for distributing power to the various GAINs in the galley according to the present invention. Box 100 represents the galley's main power and control board that provides power to the galley for all of the appliances and power clients such as lighting, ovens, chillers, etc. The main power unit 100 is connected to a power control and distribution device 110 that is responsible for allocating and distributing power to the various power clients on a priority basis set forth in the power control and distribution's logic. The priority can be based on the importance of the needs of the galley, such as always allocating power first to the lighting system 120, or providing power to refrigeration units before ovens to preserve perishables. The power control and distribution device 110 interconnects the galley's main power 100 to all of the appliances that are found in the galley, such as ovens 18, beverage chillers 24, air chillers 25, as well as lighting panels 120 and other lighting, and various other inserts.

In operation, each GAIN requests power from the power control and distribution device 110, which allocates the available power from the main galley power unit 100 to the requesting GAIN based on a hierarchy in its control logic. Each of the various GAINs is assigned a priority, and the power control and distribution device maintains the priority in allocating the limited power available to the galley.

The integrated galley and appliance operating system of the present invention provides a single operating interface (control panel 30) for electrical appliances such ovens, coffee makers, refrigerators, etc., eliminating the need for individual controls at each appliance. A total system controller unit 40 is located remote from the appliances with sufficient capability to operate each one individually or as combined functions. For example, two or more ovens could be started on similar cooking cycles through the controller unit 40 starting at the same time. The result is that the meals are finished at the same time, reducing work load on flight attendants. In addition, the controller 40 monitors all of the appliances and prioritize work efforts. The total system controller 40 also preferably monitors appliances for diagnostic purposes, and produces a system "health" status to aircraft maintenance personnel or maintenance communication systems. The integrated control system has the power controls built in and provides power management for optimizing power usage. Thus, the integrated controller approach is a new concept that reduces overall parts and components in the galley, saving weight, costs, space, and time in the operation of the galley.

The capacity to start or operate multiple aircraft galley GAINs using a single, remote control panel is a useful feature of the present invention. For example, setting a temperature for all of the galley chillers at one time, or setting all of the oven temperatures from the control panel is not found in current systems. Moreover, the integrated approach allows for power allocation from a power control and distribution unit, which distributes power to the various equipment in the galley according to a predetermined protocol. This ensures that the power requirements of the galley are met and that certain lower priority GAINs do not usurp power from higher priority power clients. Moreover, the integrated galley includes a display panel that monitors the status functionality of the galley inserts. Monitoring the equipment is accomplished by scrolling or requesting the information from the control panel, which can access the status of each equipment and provide rapid response to the request for status of each individual apparatus.

Figure 5:
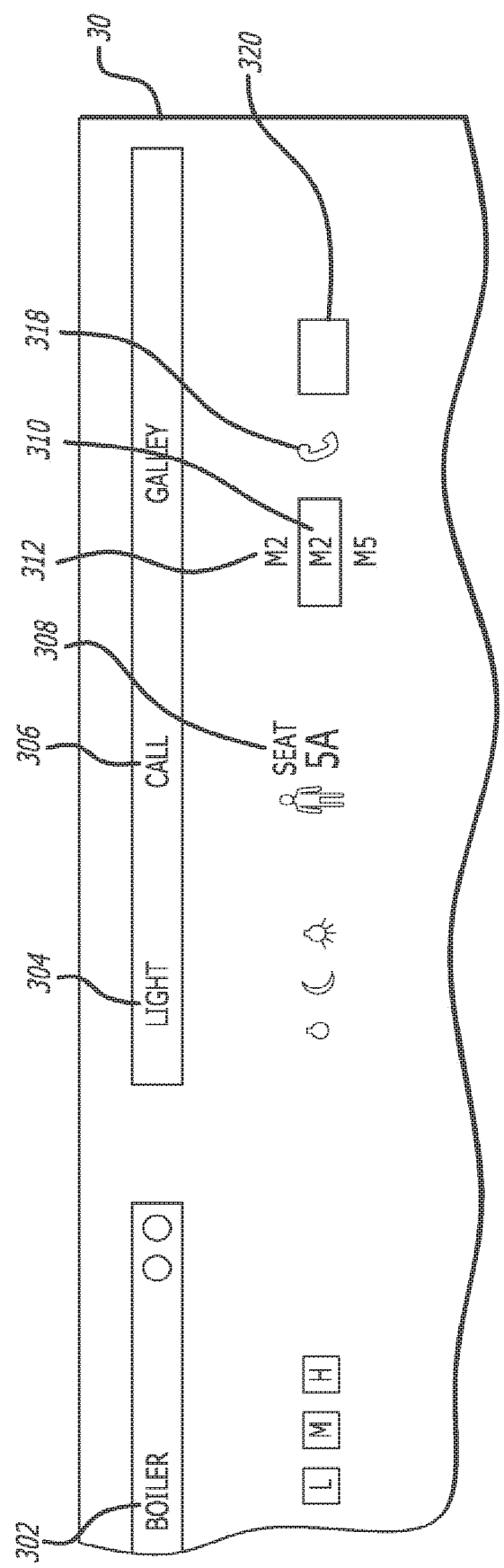
FIG. 5 is an illustration of a communication panel that is part of the control panel of FIG. 2

Another preferred feature of the control panel 30 is a communication system that is established between galleys on the aircraft, passengers and the galley, and flight attendants interacting with both the galley and the passengers. FIG. 5 illustrates a portion of the control panel 30 that includes a communication mode that allows direct communication between galleys, and between passengers. In FIG. 5, a series of control items are shown as part of a larger control panel 30. There is a boiler control 302 including "L", "M", and "H" buttons corresponding to low, medium, and high, respectively. Thus, the boiler located below the control panel 30 forming part of the galley can be controlled by the controls 302 along the control panel. Additionally, lighting controls 304 show an "off" icon, a "dim" icon, and a "bright" icon corresponding to various conditions for the overhead lights. Next to the light controls 304 is a passenger communication link 306 for communicating with a passenger on the plane. the passenger communication link 306 forms part of a wireless or wired system that can relay voice or data from the passengers to the galley. In the example shown, a passenger icon 308 is shown along with a seat designation "5A", identifying the communication as coming from the passenger in seat 5A. As stated above, the link can be a voice link where the passenger speaks into a microphone and the voice signal is transmitted to the galley via a voice data line or wireless link, or the link can be a data link that transmits textual messages to a display screen. By depressing the icon using the touch screen technology, a two-way communication link is established with passenger 5A, indicated by the icon 318 of a telephone showing the link is active. The passenger can then request a beverage, ask a question, or convey some information to the galley. In the example, shown, a speaker 320 is shown designated a voice link, along with a telephone icon 318 that illuminates when the link is active.

In addition to the passenger link 306, there is a galley-to-galley link 312. Display element 310 illustrates a list of other galleys on the aircraft (M1, M2, . . . M5). To establish a communication link between another galley, the desired galley designation within the list is depressed, illuminating the galley to be called. The attendant then presses the telephone icon, initiating a call to the requested galley. Speaker 320 relays the other party's voice to the galley, or a handset can be used. Alternatively, the voice mode can be replaced with a text mode, where communications are entered via a keyboard and a screen displays the communication, both to the passenger and the galley. In this manner, the galley can automatically create two way communication between galleys in the aircraft.

In a preferred embodiment, the galley can also be accessed by a hand-held communication device such as a smart phone, PDA, or other hand held communication device. Using an app or special function on the hand-held device, an attendant can press a button or sequence of buttons to initiate a call to the galley. This leads to further access and communication between the galleys, passengers, and flight attendants. In the case of the hand held device carried by the flight attendant, the screen may display a text of the communication rather than a voice communication in the alternate embodiment.

Figure 6:
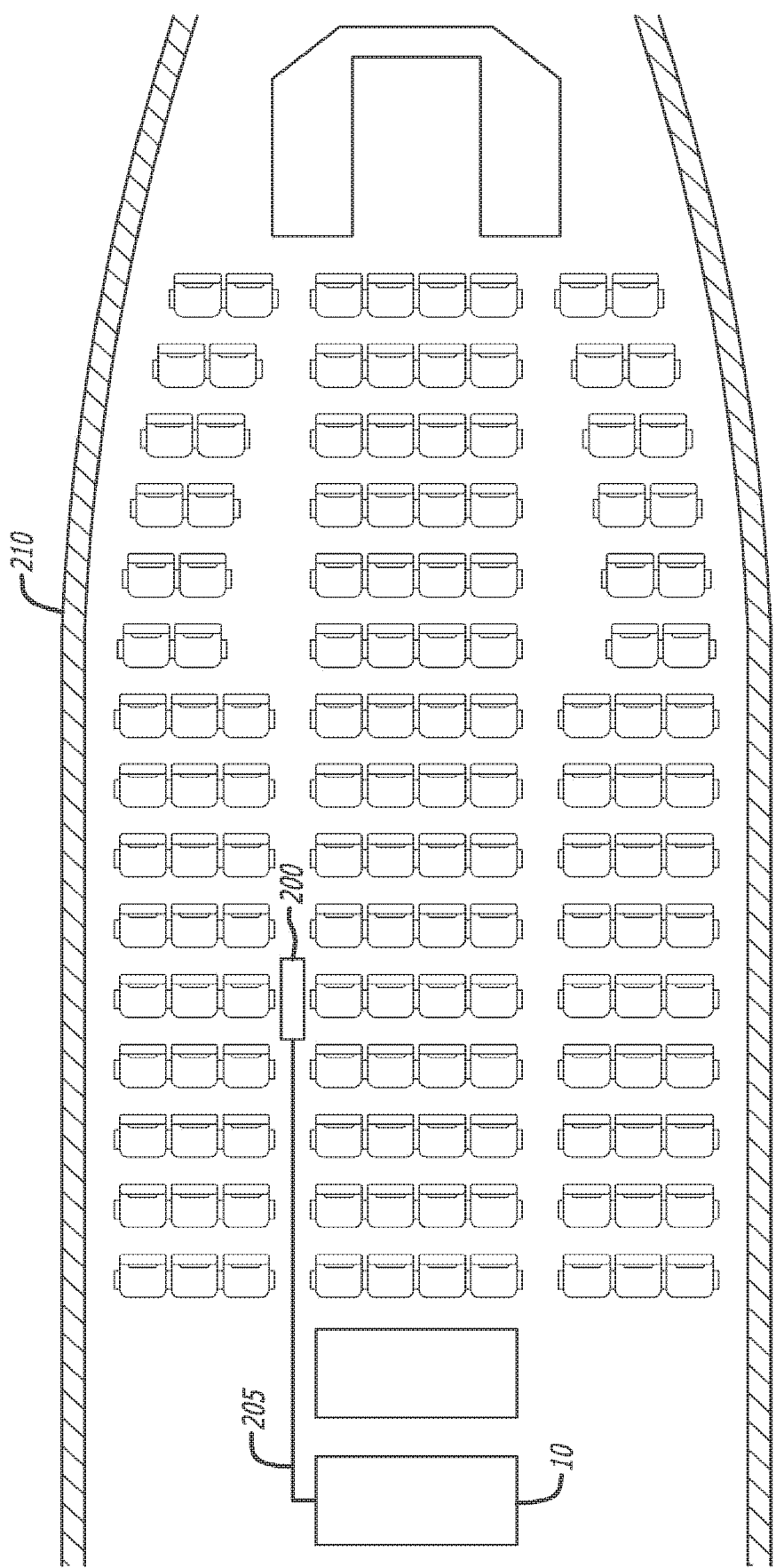
FIG. 6 is a schematic of an aircraft interior that is part of a display on the communication panel of FIG. 5.

The following examples are illustrative of the advantages of the communication-linked galley of the present invention. A flight attendant is out on the floor conducting any number of meal services during the flight (see FIG. 6). There are a set number of meal types (beef-chicken-vegetable) available and, as the attendant gets to the end of her service she runs out of beef. The attendant needs to communicate back to the galley to request another beef meal without leaving her cart and interrupting the flow of her service. The attendant on the floor reaches into her pocket and removes a handheld communication device 200 such as a smart phone or PDA, and activates an application that opens a communication link 205 to the galley 10. She selects the "CALL GALLEY" button and talks to the purser in the galley to request another beef meal. The purser in the galley: hearing a ringing in the galley, immediately looks at the display panel on the control panel 30 for information about who is calling. The purser sees a pulsing signal or other indicator next to an illuminated map of the plane 210. The map shows the purser where the call is coming from. She picks up the galley phone to take the call, and can thus deliver the meal to the attendant directly without wasting time.

Figure 7:
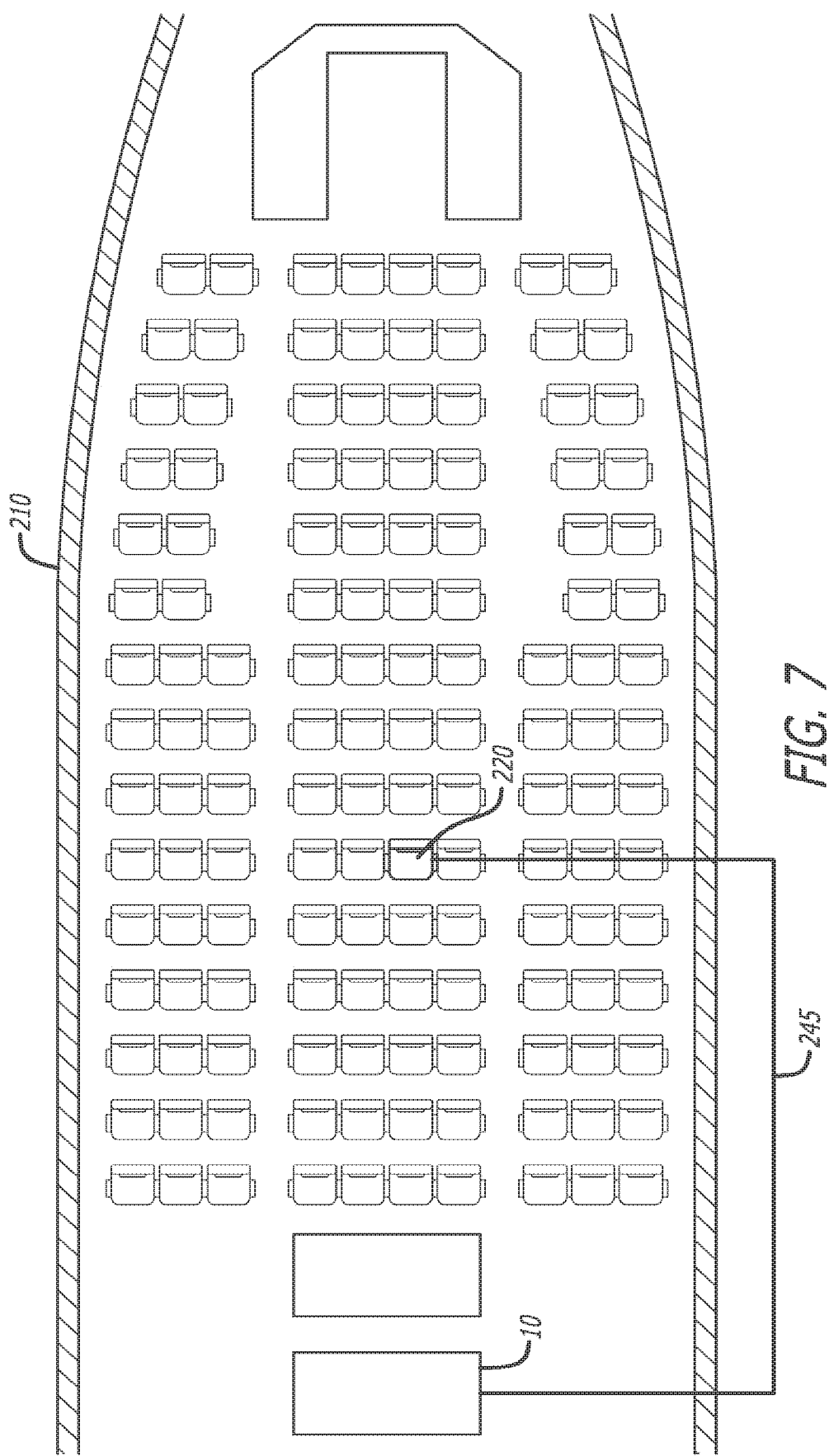
FIG. 7 is another schematic of an aircraft interior that is part of the display on the communication panel.

FIG. 7 illustrates another example of the benefit of the communication galley of the present invention. Passenger X 220 is sitting midway between door 4 and 5 of the aircraft. The passenger would like a particular beverage from the selected menu items, but there are no flight attendants in sight and he is sitting in a middle seat. Rather than getting up or ringing the call bell, he simply navigates an overhead display to request his menu item along a data bus 245. A purser in the galley 10 is made aware of Passenger X's request through the control panel 30 (see FIG. 5) graphical display, along with preferably an audible signal such as a beep or bell ring to draw attention to the request. The display communicates to the purser which passenger the request came from via a map of the plane 210, and describes what was ordered, either through a code, a scrolling ticker, or the like. The purser pushes a button on the control panel to send a signal back to Passenger X along the data bus 245 acknowledging the request and letting the passenger know that the request is being tended to. After only a few seconds, Passenger X sees an automated reply pop up on his personal display screen letting him know his request is in progress and that his credit card has been charged.

In yet another example, the purser in the previous example realizes her galley is out of Passenger X's request, and presses the icon corresponding to the adjacent galley and presses the phone icon, initiating a call to the adjacent galley. A purser at the next galley hears a ring tone and quickly looks at the control panel in that galley to see who is calling. She sees that it is the adjacent galley and answers the phone, where the purser in the first galley asks if the product in question is in the adjacent galley. The purser responds that there is, and offers to take the product to Passenger X at his seat location. Thus, the galley to galley communication saves both time and effort in meeting the passenger's demands.

From the foregoing, it can be seen that the integrated galley and communication system can save time, weight, and costs in the galley. Although various embodiments have been described, it is to be understood that various modifications and substitutions would be appreciated by one of ordinary skill in the art, and the present invention is intended to include all such modifications and substitutions. Accord-

What is claimed is:

1. A system for communicating between passenger seats and an aircraft galley, comprising:
   a control unit including a touch screen display area for interfacing with a crew member; and
   a plurality of devices, each positioned at a respective passenger seat, wherein the control unit is in communication with the plurality of devices, wherein the plurality of devices is a plurality of personal display screens, wherein a particular personal display screen of the plurality of personal display screens is configured to indicate that the particular order is in progress and that a credit card has been charged;
   wherein the control unit is adapted to display on the touch screen display area data related to a particular order, including a location of an associated passenger seat from which the particular order originated, and wherein the control unit is further adapted to transmit to a particular device of the plurality of devices associated with the order notifications concerning a status of the particular order;
   wherein the control unit is further configured to receive operational signals from a plurality of appliances and to present, upon the touch screen display area of the control unit, operational information regarding a portion of the plurality of appliances,
   wherein the control unit is further configured to control operation of one or more of the plurality of appliances.

2. The system of claim 1, wherein the control unit is further configured to communicate with a crew handheld device.

3. The system of claim 2, wherein communication with the crew handheld device is wireless.

4. The system of claim 1, further comprising a plurality of appliance controls, the plurality of appliance controls comprising at least one control configured for simultaneously controlling operation of at least two appliances of the plurality of appliances.

5. The system of claim 4, wherein the at least two appliances are at least two ovens, at least two beverage brewing machines, at least two toasters, at least two chillers, or at least two trash compactors.

6. The system of claim 4, wherein simultaneously controlling operation comprises issuing commands to each appliance of the at least two appliances to effect a same setting for each of the at least two appliances.

7. The system of claim 4, wherein the control unit is further configured to communicate with a crew handheld device, wherein communication with the crew handheld device is wireless.

8. The system of claim 1, wherein a communication bus further provides a communication connection between the control unit and a lighting system of the aircraft galley.

9. The system of claim 1, wherein the control unit is remotely located from the plurality of appliances.

10. The system of claim 1, wherein the control unit is configured to:
    receive, via a first control of a plurality of appliance controls, an indication of an operating parameter setting for at least one appliance of the plurality of appliances; and
    cause adjustment of the at least one appliance according to the operating parameter setting.

11. The system of claim 1, wherein the control unit is configured to display diagnostic information comprising an error code corresponding to a first appliance of the plurality of appliances.

12. The system of claim 1, wherein the control unit is configured to display diagnostic information representing an operating status.

13. The system of claim 1, wherein the control unit is configured to access, from each appliance of the plurality of appliances, status information.

14. The system of claim 1, wherein the control unit is configured to communicate, to a maintenance communication system, a portion of operational information including at least one of diagnostic information and maintenance information.

15. The system of claim 1, wherein the control unit is positioned in the galley.

16. The system of claim 1, further comprising a communication bus providing a communication connection between the control unit and each of the plurality of devices.

17. The system of claim 16, wherein the communication bus further provides a communication connection between the control unit and the plurality of appliances.

18. The system of claim 1, wherein the particular order is a particular food or beverage order.

19. The system of claim 1, wherein the control unit is in wireless communication with the plurality of devices.

* * * * *